(12) United States Patent
Herkel et al.

(10) Patent No.: US 11,993,481 B2
(45) Date of Patent: May 28, 2024

(54) ELEVATOR SYSTEM

(71) Applicant: Otis Elevator Company, Farmington, CT (US)

(72) Inventors: Peter Herkel, Berlin (DE); Dirk Tegtmeier, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 1455 days.

(21) Appl. No.: 16/338,882

(22) PCT Filed: Sep. 22, 2017

(86) PCT No.: PCT/EP2017/074028
§ 371 (c)(1),
(2) Date: Apr. 2, 2019

(87) PCT Pub. No.: WO2018/065239
PCT Pub. Date: Apr. 12, 2018

(65) Prior Publication Data
US 2021/0276825 A1 Sep. 9, 2021

(30) Foreign Application Priority Data
Oct. 4, 2016 (EP) .................................... 16192125

(51) Int. Cl.
B66B 1/34 (2006.01)
B66B 5/00 (2006.01)
(Continued)

(52) U.S. Cl.
CPC .......... B66B 1/3492 (2013.01); B66B 5/0018 (2013.01); G01B 3/10 (2013.01); G01P 3/00 (2013.01); G01P 15/00 (2013.01)

(58) Field of Classification Search
CPC ....... B66B 1/3492; B66B 5/0018; G01B 3/10; G01P 3/00; G01P 15/00
See application file for complete search history.

(56) References Cited

U.S. PATENT DOCUMENTS 4,880,082 A 11/1989 Kahkipuro et al.
6,526,368 B1 2/2003 Coste et al.
(Continued)

FOREIGN PATENT DOCUMENTS

EP 2748093 B1 3/2015
EP 3978406 A1 * 4/2022 ........... B66B 1/3492
(Continued)

OTHER PUBLICATIONS

International Search Report and Written Opinion for application PCT/EP2017/074028, dated Dec. 12, 2017, 12 pages.
(Continued)

Primary Examiner — Jeffrey Donels
(74) Attorney, Agent, or Firm — CANTOR COLBURN LLP

(57) ABSTRACT

An elevator system (2) comprises a hoistway (4) extending between a plurality of landings (8); the hoistway (4) comprising landing portions (A) and intermediate portions (B), wherein each landing portion (A) extends around a corresponding landing (8) and each intermediate portion (B) is located between two adjacent landing portions (A); an elevator car (6), which is configured for traveling along the hoistway (4); a first position determining system (15), which is configured for determining the current position of the elevator car (6) while it is located within one of the landing portions (A); and a second position determining system (17), which is configured for determining the current position of the elevator car (6) while it is located within one of the intermediate portions (B).

9 Claims, 2 Drawing Sheets

Figure 1:
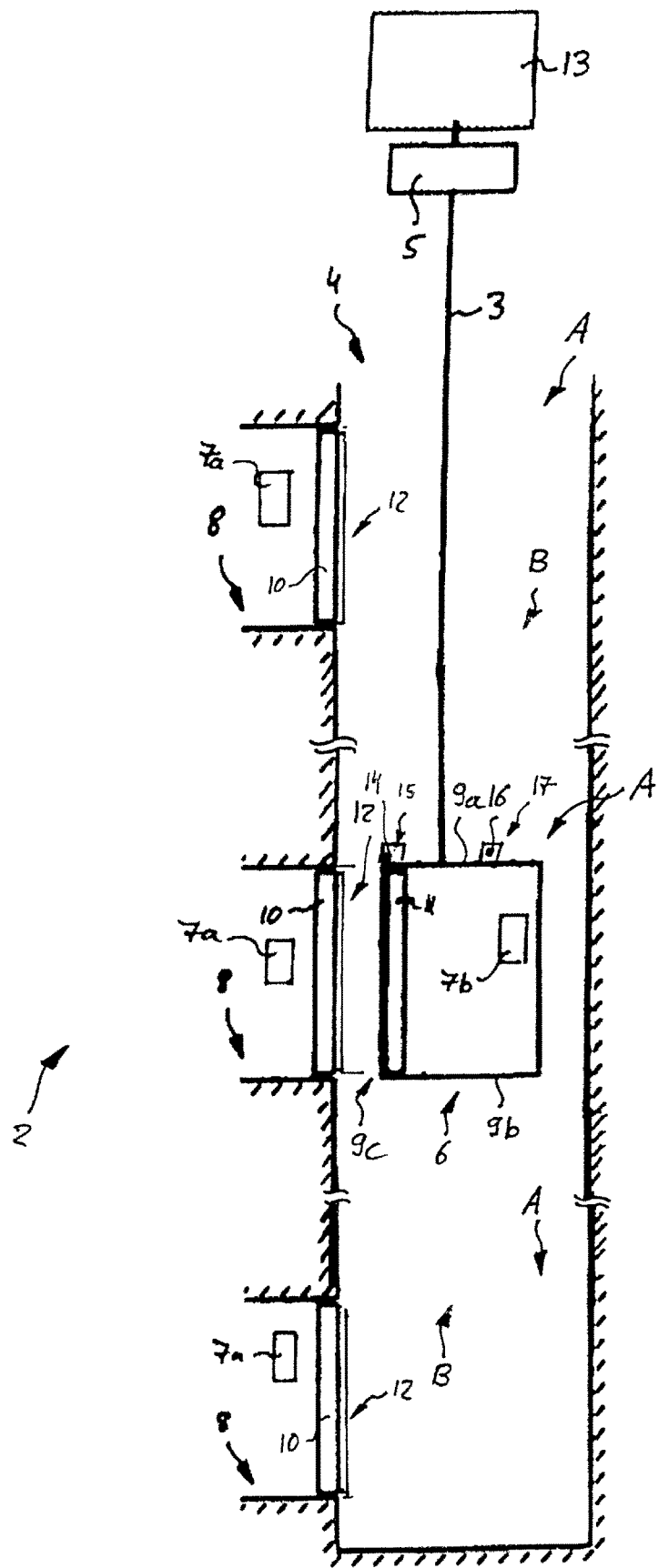

(51) Int. Cl.
*G01B 3/10* (2020.01)
*G01P 3/00* (2006.01)
*G01P 15/00* (2006.01)

(56) References Cited

U.S. PATENT DOCUMENTS

| | | | |
|---|---|---|---|
| 7,434,666 | B2 | 10/2008 | Tyni et al. |
| 7,546,903 | B2 | 6/2009 | Kattainen et al. |
| 7,703,579 | B2 | 4/2010 | Tyni et al. |
| 7,950,499 | B2 | 5/2011 | Okamoto et al. |
| 7,958,970 | B2 | 6/2011 | Ma et al. |
| 8,464,841 | B2 | 6/2013 | Birrer et al. |
| 9,033,114 | B2 | 5/2015 | Mizon |
| 9,372,083 | B2 | 6/2016 | Kang et al. |
| 10,472,204 | B2 * | 11/2019 | Rohr .................. B66B 9/00 |
| 2008/0135346 | A1 | 6/2008 | Kattainen et al. |
| 2012/0181118 | A1 | 7/2012 | Choi et al. |
| 2014/0330535 | A1 | 11/2014 | Van Den Heuvel et al. |
| 2015/0083528 | A1 | 3/2015 | Kattainen et al. |
| 2019/0210832 | A1 * | 7/2019 | Toutaoui ............... B66B 5/0031 |

FOREIGN PATENT DOCUMENTS

| | | | |
|---|---|---|---|
| JP | 2009220904 A | 10/2009 | |
| WO | 2016087528 A1 | 6/2016 | |
| WO | WO-2017076734 A1 * | 5/2017 | ............... B66B 1/28 |

OTHER PUBLICATIONS

Nikbakht, S., et al., "Evaluation of Solid-State Accelerometer for Positioning of Vehicle", available at: https://staff.fnwi.uva.nl/m.mazloom/Papers/mazloom,saleh.pdf, Aug. 2, 2005, 6 pages.

Tou, W. K., et al., "Elevator absolute landing position sensor using infrared interrupter and MEMS accelerometer", Abstract, 2015 5th Australian Control Conference, Nov. 5-6, 2015, 1 page.

* cited by examiner

ELEVATOR SYSTEM

The invention relates to an elevator system, in particular to an elevator system comprising a position determining system which is configured for determining the position of an elevator car of the elevator system. The invention further relates to a method of determining the position of an elevator car within a hoistway of an elevator system.

Elevator systems typically comprise an elevator car moving along a hoistway which extends between a plurality of landings. In order to prevent passengers from tripping when entering or leaving the elevator car, it is desirable to position the elevator car exactly at the respective landing, in particular avoiding a difference of height, i.e. a step, between a floor of the elevator car and a floor of the respective landing.

In order to control the movement of the elevator car appropriately, in particular for positioning the elevator car exactly at the desired landing, it is necessary to determine the current position of the elevator car with sufficient accuracy.

The installation and maintenance of a large number of positional sensors along the hoistway for determining the current position of the elevator car with high accuracy at every vertical position of the hoistway is expensive and laborious.

It therefore would be beneficial to provide a less expensive and less elaborate elevator system which still allows positioning the elevator car at the landings with the necessary accuracy.

According to an exemplary embodiment of the invention, an elevator system comprises:
- a hoistway extending between a plurality of landings; the hoistway comprising landing portions and intermediate portions, wherein each landing portion is associated with and located at the landings, each landing portion in particular extending around a corresponding landing, and each intermediate portion is located between two adjacent landing portions;
- an elevator car, which is configured for traveling along the hoistway;
- a first position determining system, which is configured for determining the current position of the elevator car while it is located within one of the landing portions; and
- a second position determining system, which is configured for determining the current position of the elevator car while it is located within one of the intermediate portions.

According to an exemplary embodiment of the invention, a method of determining the position of an elevator car within a hoistway of an elevator system, wherein the hoistway extends between a plurality of landings and comprises landing portions and intermediate portions, the landing portions being associated with and located at the landings, each landing portion in particular extending around a corresponding landing, and each intermediate portion being located between two adjacent landing portions, comprises the steps of:
- determining the current position of the elevator car by means of a first position determining system, while the elevator car is located within one of the landing portions; and
- determining the current position of the elevator car by means of a second position determining system, while the elevator car is located within one of the intermediate portions.

The skilled person will understand that the system may be employed in elevator systems comprising two or more elevator cars as well. Thus, if the text refers to "an" elevator car, this is not to be understood as restricting the scope of the present invention to an elevator system comprising only a single elevator car.

In exemplary embodiments of the invention, the first position determining system in particular may be configured for determining the current position of the elevator car with high accuracy while it is located within one of the landing portions in order to allow for positioning the elevator car exactly at the desired landing.

In the intermediate positions in between the landing areas, however, it is sufficient to determine the current position of the elevator car with less accuracy. In consequence, a less expensive/elaborate position determining system may be used when the elevator car is positioned in the intermediate positions.

As a result, the invention allows to reduce the costs and complexity of an elevator system without deteriorating the ability of positioning the elevator car at the landing positions with high accuracy.

Exemplary embodiments of the invention will be described in more detail with respect to the enclosed figures:

FIG. 1 schematically depicts an elevator system according to an exemplary embodiment of the invention.

Figure 2:
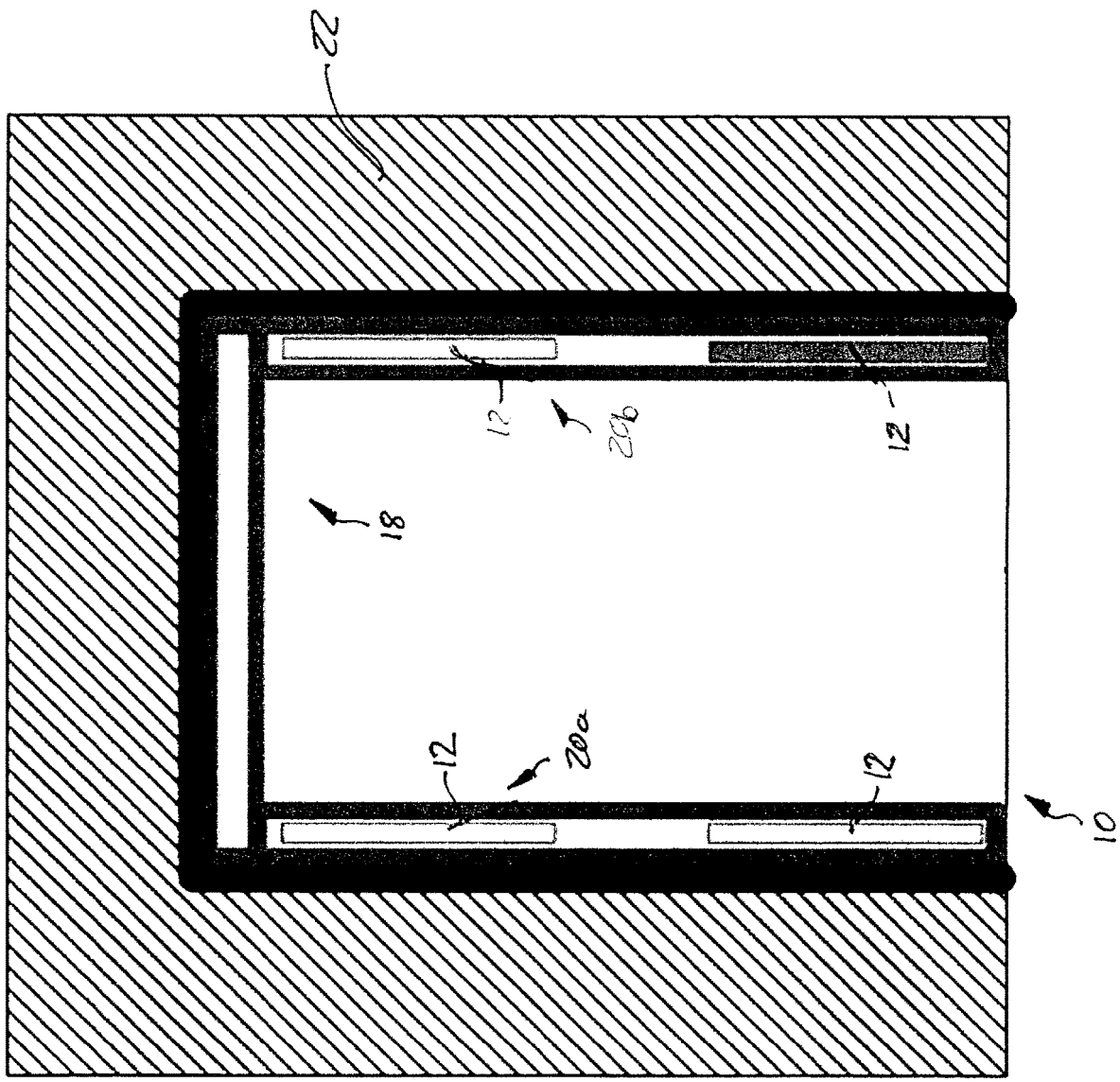

FIG. 2 schematically depicts an enlarged view of a landing area according to an exemplary embodiment of the invention.

FIG. 1 schematically depicts an elevator system 2 according to an exemplary embodiment of the invention.

The elevator system 2 includes an elevator car 6 which is movably arranged within a hoistway 4 extending between a plurality of landings 8.

The elevator car 6 is movably suspended by means of a tension member 3. The tension member 3, for example a rope or belt, is connected to an elevator drive 5, which is configured for driving the tension member 3 in order to move the elevator car 6 along the height of the hoistway 4 between the plurality of landings 8 located on different floors.

Each landing 8 is provided with a landing door 10, and the elevator car 6 is provided with a corresponding elevator car door 11 for allowing passengers to transfer between a landing 8 and the interior of the elevator car 6 when the elevator car 6 is positioned at the respective landing 8.

The exemplary embodiment shown in FIG. 1 uses a 1:1 roping for suspending the elevator car 6. The skilled person, however, easily understands that the type of the roping is not essential for the invention and that different kinds of roping, e.g. a 2:1 roping, may be used as well. The elevator system 2 may use a counterweight (not shown) or not. The elevator drive 5 may be any form of drive used in the art, e.g. a traction drive, a hydraulic drive or a linear drive. The elevator system 2 may have a machine room or may be a machine room-less elevator system. The elevator system 2 may use a tension member 3, as it is shown in FIG. 1, or it may be an elevator system without a tension member 3.

The elevator drive 5 is controlled by an elevator control unit 13 for moving the elevator car 6 along the hoistway 4 between the different landings 8.

Input to the control unit 13 may be provided via landing control panels 7a, which are provided on each landing 8 close to the landing doors 10, and/or via an elevator car control panel 7b provided inside the elevator car 6.

The the landing control panels 7a and the elevator car control panel 7b may be connected to the elevator control unit 13 by means of electrical lines, which are not shown in FIG. 1, in particular by an electric bus, or by means of wireless data connections.

For controlling the movement of the elevator car 6 appropriately, in particular for positioning the elevator car 6 exactly at the respective landings 8, the current position of the elevator car 6 needs to be determined with sufficient accuracy.

In order to determine the current position of the elevator car 6 in landing portions A extending along the height of the hoistway 4 at each landing 8, the elevator car 6 is equipped with a first position determining system 15 comprising at least one position detection sensor 14. The at least one position detection sensor 14 is configured for detecting at least one position detection element 12, which is provided in each landing portion A of the hoistway 4. In the embodiment shown in FIG. 1, a single position detection sensor 14 is attached to the roof 9a of the elevator car 6. Alternatively or additionally a position detection sensor 14 may be attached to the floor 9b of the elevator car 6 and/or to a sidewall 9c of the elevator car 4.

The at least one position detection element 12 may be attached to the landing doors 10, in particular to landing door frames 18 (see FIG. 2) of the landing doors 10. Details of the attachment of the position detection elements 12 will be discussed further below with reference to FIG. 2.

The position detection elements 10 may include coded tapes or stripes comprising an optical code, which is optically detected by the position detection sensor(s) 14 in order to determine the current position of the elevator car 6 within the hoistway 4.

Alternatively or additionally, the position detection elements 10 may comprise a magnetic, electrical and/or mechanical code, which is configured to be detected by correspondingly configured position detection sensor(s) 14 in order to determine the current position of the elevator car 6 within the landing portions A of the hoistway 4.

In order to determine the current position of the elevator car 6 in intermediate portions B of the hoistway 14, which are respectively located between two adjacent landing portions A, the elevator car 6 is equipped with a second position determining system 17 comprising at least one speed/acceleration sensor 16, which is configured for determining the current speed and/or acceleration of the elevator car 6.

When the elevator car 6 leaves one of the landing portions A, in which the current position of the elevator car 6 is determined by means of the position detection sensor 14 detecting a position detection element 12, the further change of the position of the elevator car 6 is determined by the second position determining system 17 by measuring the current speed and/or the current acceleration of the elevator car 6 with the at least one speed/acceleration sensor 16 and by integrating the current speed of the elevator car 6 and/or the current acceleration of the elevator car 6 detected by the speed/acceleration sensor 16 over time.

The positional information of the elevator car 6, which is determined in this way, may be less accurate than the positional information which is achieved from the first position determining system 15 within the landing portions A. However, very accurate positional information is needed only when the elevator car 6 is positioned within one of the landing portions A in order to allow to position the elevator car 6 exactly at the desired landing 10. The second position determining system 17 comprising the speed/acceleration sensor 16 bridges the gaps between the landing portions A and allows to determine the current position of the elevator car 6 within the intermediate portions B with sufficient accuracy.

As soon as the elevator car 6 enters one of the landing portions A, the current position of the elevator car 6 is determined and updated by means of the first position determining system 15 including the position detection sensor 14 and the landing portions 10 with increased accuracy. The accuracy of the position information provided by the first position determining system 15 allows to position the elevator car 6 at the desired landing 8 with the desired high accuracy.

FIG. 2 shows a schematic front view of a landing area of an elevator system 2 according to an exemplary embodiment of the invention.

FIG. 2 in particular depicts a landing door frame 18 of a landing door 10 viewed from the hoistway 4. Door leaves of the landing door 10 are not shown in FIG. 2.

Position detection elements 12, which in particular may be coded tapes or stripes, are attached to the lateral posts 20a, 20b of the landing door frame 18.

In the embodiment shown in FIG. 1, position detection elements 12 are attached to both lateral posts 20a, 20b of the landing door frame 18. This may be done for redundancy and/or for enhancing the quality/accuracy of the positional information achieved from the position detection sensor(s) 14 attached to the elevator car 6.

The skilled person, however, will understand that it is sufficient to provide position detection elements 12 at only one of the lateral posts 20a, 20b of the landing door frame 18.

In an alternative or additional embodiment, which is not shown in the figures, position detection elements 12 may be attached to the wall 22 of the hoistway 4 next or opposite to the landing doors 10. Attaching the position detection elements close to the landing doors 10 facilitates their installation and maintenance.

A number of optional features are set out in the following. These features may be realized in particular embodiments, alone or in combination with any of the other features.

According to one embodiment, the first position determining system may comprise a position detection sensor, which is attached to the elevator car, and at least one position detection element. The position detection element is attached to the hoistway and configured to be detected by the position detection sensor. In consequence, determining the current position of the elevator car by means of the first position determining system may include detecting at least one position detection element, which is attached to the hoistway, with a position detection sensor attached to the elevator car.

The interaction between a position detection sensor, which is attached to the elevator car, and at least one position detection element, which is attached to the hoistway, allows for a reliable determination of the current position of the elevator car with good accuracy.

According to one embodiment, the at least one position detection element may be attached in the area of at least one of the landings, in particular to at least one door frame provided at one of the landings. Position detection elements, which are attached close to a landing, in particular on or next to a landing door frame, may be installed and maintained conveniently as they may be accessed easily from one of the landings.

The at least one position detection element in particular may be attached to at least one post of a landing door frame. The position detection elements in particular may be attached to the door frame when it its produced within the factory so that there is no need to enter the hoistway for installing the position detection elements.

According to one embodiment, the position detection elements may comprise at least one coded tape or strip extending in the direction of the height of the hoistway. The tape or strip may be provided with an optical code, which is configured to be optically detected by the position detection sensor(s) for determining the current position of the elevator car within the hoistway.

Alternatively or additionally, the position detection elements may comprise a magnetic, electrical and/or mechanical code, which is detected by correspondingly configured position detection sensor(s) in order to determine the current position of the elevator car within the hoistway. A coded tape or strip allows to determine the current position of the elevator car with high accuracy.

According to one embodiment, the second position determining system comprises a speed sensor, which is attached to the elevator car and configured for determining the speed of the elevator car. In this case, the second position determining system may be configured for determining the current position of the elevator car by integrating the speed detected by the speed sensor over time. This allows to determine the current position of the elevator car in the intermediate portions of the hoistway, in which no position detection elements are present, with sufficient accuracy.

According to one embodiment, the second position determining system comprises an acceleration sensor, which is attached to the elevator car and configured for determining the acceleration of the elevator car. In this case, the second position determining system may be configured for determining the current position of the elevator car by integrating the acceleration detected by the acceleration sensor twice over time. This allows to determine the current position of the elevator car in the intermediate portions of the hoistway, in which no position detection elements are present, with sufficient accuracy.

According to one embodiment, the second position determining system may be configured for determining the current position of the elevator car while it is located within one of the landing portions as well. The second position determining system then may be configured for calibrating itself by comparing the position of the elevator car determined by the second position determining system with a position which is determined by the first position determining system, while the elevator car is positioned within one of the landing portions. As a result, the accuracy of the positional information provided by the second position determining system is enhanced.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention shall not be limited to the particular embodiment disclosed, but that the invention includes all embodiments falling within the scope of the dependent claims.

REFERENCES 2 elevator system
3 tension member
4 hoistway
5 drive
6 elevator car
7a landing control panel
7b elevator car control panel
8 landing
9a roof of the elevator car
9b floor of the elevator car
9c sidewall of the elevator car
10 landing door
11 elevator car door
12 position detection element
13 elevator control unit
14 position detection sensor
15 first position determining system
16 speed/acceleration sensor
17 second position determining system
18 landing door frame
20a, 20b lateral posts of the landing door frame
22 wall of the hoistway

The invention claimed is:

1. An elevator system (2) comprising:
a hoistway (4) extending between a plurality of landings (8), each landing (8) having a landing door (10) with a landing door frame (18); the hoistway (4) comprising landing portions (A) and intermediate portions (B), wherein each landing portion (A) is associated with a corresponding landing (8) and each intermediate portion (B) is located between two adjacent landing portions (A);
an elevator car (6), which is configured for traveling along the hoistway (4);
a first position determining system (15), which is configured for determining the current position of the elevator car (6) while it is located within one of the landing portions (A);
a second position determining system (17), which is configured for determining the current position of the elevator car (6) while it is located within one of the intermediate portions (B);
wherein the first position determining system (15) includes at least one position detection sensor (14), which is attached to the elevator car (6), and position detection elements (12) attached to the landing door frames (18) and including at least one coded strip or tape extending in the direction of the height of the hoistway (4).

2. The elevator system (2) according to claim 1, wherein the position detection element (12) comprises at least one coded tape extending along the height of hoistway (4).

3. The elevator system (2) according to claim 1, wherein the second position determining system (17) comprises a speed sensor (16), which is attached to the elevator car (6) and configured for determining the speed of the elevator car (6), and wherein the second position determining system (17) is configured for determining the current position of the elevator car (6) by integrating the speed determined by the speed sensor (16) over time.

4. The elevator system (2) according to claim 1, wherein the second position determining system (17) comprises an acceleration sensor (16), which is attached to the elevator car (6) and configured for determining the acceleration of the elevator car (6), and wherein the second position determining system (17) is configured for determining the current position of the elevator car (6) by integrating the acceleration determined by the speed sensor (16) over time.

5. The elevator system (2) according to claim 1, wherein the second position determining system (17) is additionally configured for determining the current position of the elevator car (6) while it is located within one of the landing portions (A) and to be calibrated by comparing the position of the elevator car (6) determined by the second position determining system (17) with a position which is determined by the first position determining system (15), while the elevator car (6) is positioned within one of the landing portions (A).

6. A method of determining the position of an elevator car (6) within a hoistway (4) of an elevator system (2), the hoistway (4) extending between a plurality of landings (8) and comprising landing portions (A) and intermediate portions (B), wherein each landing portion (A) is associated with a corresponding landing (8) and each intermediate portion (B) is located between two adjacent landing portions (A)), wherein each landing (8) has a landing door (10) with a landing door frame (18);

wherein the method comprises determining the current position of the elevator car (6) by means of a first position determining system (15), while the elevator car (6) is located within one of the landing portions (A), wherein determining the current position of the elevator car (6) includes detecting, with a position detection sensor (14) attached to the elevator car (6), at least one position detection element (12), which is attached to the landing door frames (18) and includes at least one coded strip or tape extending in the direction of the height of the hoistway (4); and wherein the method comprises determining the current position of the elevator car (6) by means of a second position determining system (17), while the elevator car (6) is located within one of the intermediate portions (B).

7. The method according to claim 6, wherein determining the current position of the elevator car (6) by means of the second position determining system (17) includes determining a speed of the elevator car (6) by means of a speed sensor (16) attached to the elevator car (6) and integrating the speed determined by the speed sensor (16) over time.

8. The method according to claim 6, wherein determining the current position of the elevator car (6) by means of the second position determining system (17) includes determining an acceleration of the elevator car (6) by means of an acceleration sensor (16) attached to the elevator car (6) and integrating the acceleration determined by the speed sensor (16) over time.

9. The method according to claim 6, wherein the method includes determining the current position of the elevator car (6) while it is located within one of the landing portions (A) and calibrating the second position determining system (17) by comparing the position of the elevator car (6) determined by the second position determining system (17) with a position which is determined by the first position determining system (15), while the elevator car (6) is positioned within a landing portion (A) of the hoistway (4).

* * * * *